US011214139B2

United States Patent
Yagi et al.

(10) Patent No.: US 11,214,139 B2
(45) Date of Patent: Jan. 4, 2022

(54) MOTORCYCLE

(71) Applicant: SUZUKI MOTOR CORPORATION, Hamamatsu (JP)

(72) Inventors: Shintaro Yagi, Hamamatsu (JP); Yasuhito Saiki, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 16/790,385

(22) Filed: Feb. 13, 2020

(65) Prior Publication Data
US 2020/0263584 A1 Aug. 20, 2020

(30) Foreign Application Priority Data
Feb. 19, 2019 (JP) .............................. JP2019-027674

(51) Int. Cl.
*B60K 13/04* (2006.01)
*F01N 3/24* (2006.01)
*F01N 13/18* (2010.01)

(52) U.S. Cl.
CPC ................ *B60K 13/04* (2013.01); *F01N 3/24* (2013.01); *F01N 13/1805* (2013.01); *F01N 2590/04* (2013.01)

(58) Field of Classification Search
CPC .. F01N 13/10; F01N 13/1805; F01N 2590/04; B60K 13/04
See application file for complete search history.

(56) References Cited

U.S. PATENT DOCUMENTS

| | | | |
|---|---|---|---|
| 6,662,555 B1 | 12/2003 | Ishii | 60/302 |
| 2006/0236685 A1* | 10/2006 | Ueshima | F01N 13/08 60/299 |
| 2019/0120130 A1 | 4/2019 | Kuroiwa et al. | |
| 2019/0249588 A1* | 8/2019 | Miura | B60K 13/06 |

FOREIGN PATENT DOCUMENTS

| | | | |
|---|---|---|---|
| EP | 0 779 206 A1 | 12/1996 | |
| EP | 2011975 A1 * | 1/2009 | F01N 13/08 |
| EP | 3 235 714 A1 | 10/2017 | |

(Continued)

OTHER PUBLICATIONS

Indian Office Action dated Jan. 18, 2021, issued by the Indian Patent Office in corresponding application IN 202014006576.

*Primary Examiner* — Jonathan R Matthias
(74) *Attorney, Agent, or Firm* — Stein IP, LLC

(57) ABSTRACT

There is provided a motorcycle which includes an engine including an exhaust port; an exhaust pipe connected to the exhaust port of the engine; and a catalyst disposed within the exhaust pipe. The exhaust pipe includes a catalyst case accommodating the catalyst, and a pipe connecting the exhaust port of the engine and the catalyst case. The catalyst is disposed in front of the engine. An occupied area of the catalyst in a direction orthogonal to a flow direction of exhaust gas is larger than an opening area of the pipe in a direction orthogonal to a flow direction of exhaust gas. A central axis of the catalyst is inclined with respect to a vehicle width direction in a vehicle front view. And the central axis of the catalyst and a center line of the engine in the vehicle width direction intersect at a position overlapping with the catalyst in the vehicle front view.

9 Claims, 4 Drawing Sheets

(56) References Cited

FOREIGN PATENT DOCUMENTS

| | | |
|---|---|---|
| EP | 3 235 715 A1 | 10/2017 |
| EP | 3 236 034 A1 | 10/2017 |
| EP | 3 236 035 A1 | 10/2017 |
| EP | 3 236 036 A1 | 10/2017 |
| EP | 3 236 037 A1 | 10/2017 |
| EP | 3 239 485 A1 | 11/2017 |
| EP | 3473828 A1 * | 4/2019 ............... F01N 3/28 |
| TW | 1645105 B | 12/2018 |
| WO | WO-2016002952 A1 * | 1/2016 ............... F02G 5/02 |
| WO | WO 2016/098907 A1 | 6/2016 |

* cited by examiner

MOTORCYCLE

CROSS-REFERENCE TO RELATED APPLICATIONS

This application is based on Japanese Patent Application (No. 2019-027674) filed on Feb. 19, 2019, the contents of which are incorporated herein by way of reference.

BACKGROUND

The present disclosure relates to a motorcycle including a catalyst for purifying exhaust gas.

Conventionally, a motorcycle includes an exhaust pipe connected to an exhaust port of an engine, and a catalyst for purifying exhaust gas is provided in the exhaust pipe. In recent years, in order to cope with regulation of exhaust gas, it has been demanded to improve the purification performance of a catalyst with respect to exhaust gas. In order to meet such a demand, it is important to dispose a catalyst upstream of the exhaust pipe as much as possible and to increase the size of the catalyst as much as possible.

For example, Patent Document 1 discloses a motorcycle in which a catalyst portion is disposed in front of a central axis line of a crankshaft in a front-rear direction.

Patent Document 1: WO 2016/098907 A1

When the catalyst is disposed below the engine, the constraint on the size of the catalyst increases due to the minimum ground height and bank angle. Therefore, the size of the catalyst cannot be sufficiently increased, and it is difficult to sufficiently improve the purification performance of the catalyst with respect to the exhaust gas.

On the other hand, when the catalyst is disposed in front of the engine, the constraint on the layout in an upper-lower direction increases. In particular, when the exhaust port of the engine and the catalyst case are excessively close to each other in the upper-lower direction, it is difficult to form a pipe connecting the exhaust port of the engine and the catalyst case. In order to satisfy such a constraint on the layout, the size of the catalyst must be limited, and it is difficult to sufficiently improve the purification performance of the catalyst.

SUMMARY

At least one aspect of the present disclosure is to improve purification performance of a catalyst with respect to exhaust gas while sufficiently securing a minimum ground height and a bank angle.

According to one aspect of the present disclosure, there is provided a motorcycle which includes an engine including an exhaust port; an exhaust pipe connected to the exhaust port of the engine; and a catalyst disposed within the exhaust pipe. The exhaust pipe includes a catalyst case accommodating the catalyst, and a pipe connecting the exhaust port of the engine and the catalyst case. The catalyst is disposed in front of the engine. An occupied area of the catalyst in a direction orthogonal to a flow direction of exhaust gas is larger than an opening area of the pipe in a direction orthogonal to a flow direction of exhaust gas. A central axis of the catalyst is inclined with respect to a vehicle width direction in a vehicle front view. And the central axis of the catalyst and a center line of the engine in the vehicle width direction intersect at a position overlapping with the catalyst in the vehicle front view.

In a motorcycle according to one aspect of the present disclosure, the catalyst is disposed in front of the engine. By adopting such an arrangement, even when the catalyst is increased in size, the minimum ground height and the bank angle can be sufficiently ensured.

In the motorcycle according to one aspect of the present disclosure, an occupied area of the catalyst in a direction orthogonal to a flow direction of exhaust gas is larger than an opening area of the pipe in a direction orthogonal to a flow direction of exhaust gas. By adopting such a configuration, it is possible to sufficiently increase the size of the catalyst and improve the purification performance of the catalyst with respect to the exhaust gas.

Further, in one aspect of the present disclosure, a central axis of the catalyst is inclined with respect to a vehicle width direction in a vehicle front view, and the central axis of the catalyst and a center line of the engine in the vehicle width direction intersect at a position overlapping with the catalyst in the vehicle front view. By adopting such an arrangement, even when the catalyst is disposed in front of the engine, the exhaust port of the engine and the catalyst case can be prevented from excessively approaching in the upper-lower direction. Therefore, it is possible to increase the size of the catalyst while a pipe connecting the exhaust port of the engine and the catalyst case can be formed, and it is possible to sufficiently improve the purification performance of the catalyst with respect to the exhaust gas.

DESCRIPTION OF EMBODIMENTS (Motorcycle 1)

Hereinafter, a motorcycle 1 according to an embodiment of the present disclosure will be described with reference to the drawings. Hereinafter, words indicating directions such as front, rear, right, left, upper, lower, and the like are used with reference to the direction viewed from a rider of the motorcycle 1. Arrows Fr, Rr, L, R, U, and Lo attached to the respective drawings respectively indicate the front, rear, left, right, upper, and lower sides of the motorcycle 1. In the embodiment, a left-right direction is the vehicle width direction of the motorcycle 1, the right side is one side of the motorcycle 1 in the vehicle width direction, and the left side is the other side of the motorcycle 1 in the vehicle width direction.

Figure 1:
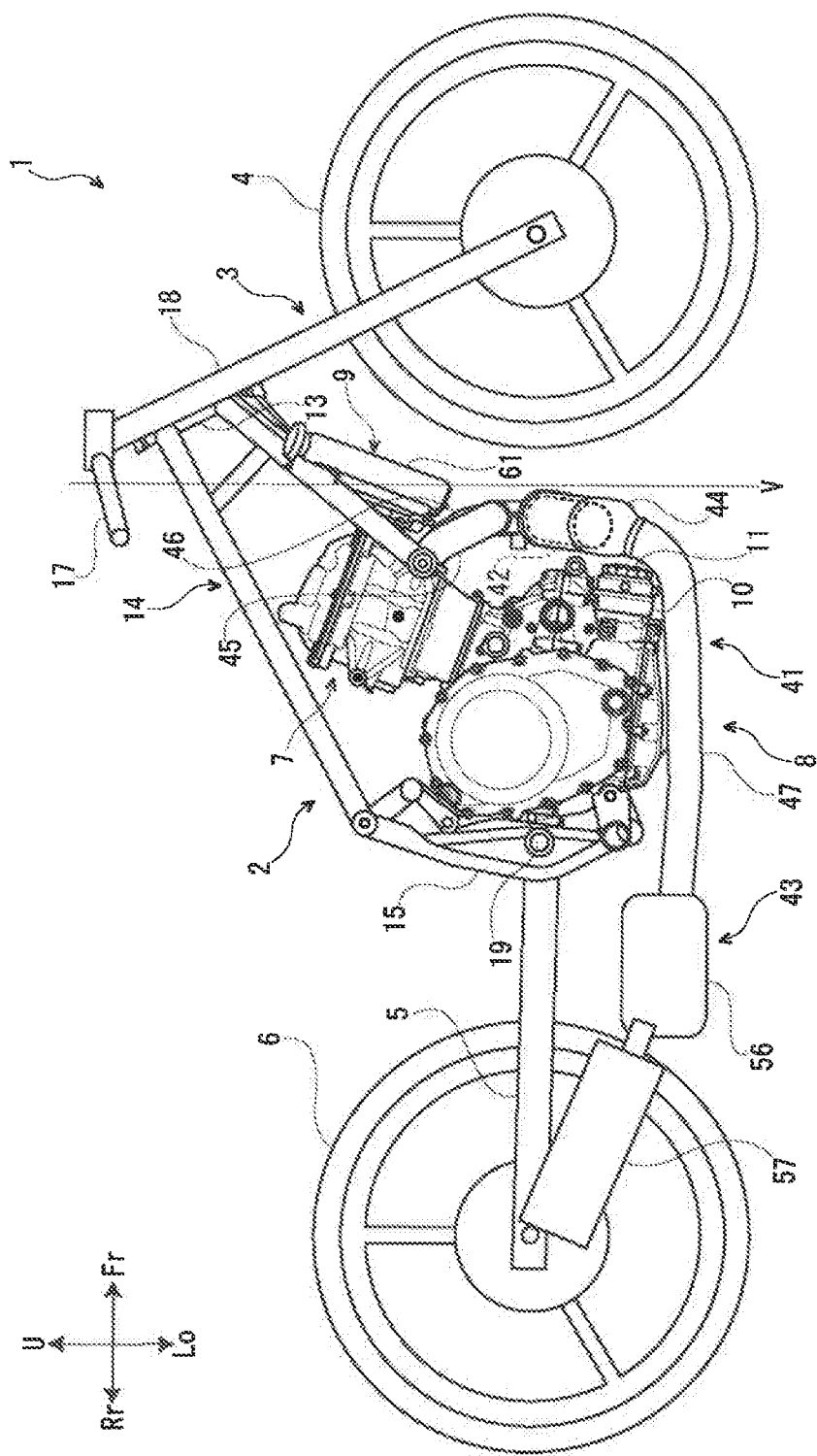
FIG. 1 is a right side view showing a motorcycle according to an embodiment of the present disclosure.

Referring to FIG. 1, the motorcycle 1 includes a vehicle body frame 2, a steering mechanism 3 and a front wheel 4 disposed in front of the vehicle body frame 2, a pair of left and right swing arms 5 and a rear wheel 6 disposed behind the vehicle body frame 2, an engine 7 suspended on the vehicle body frame 2, an intake device (not shown) and an exhaust device 8 connected to the engine 7, a radiator 9 disposed in front of the engine 7, an oil cooler 10 and an oil filter 11 disposed in front of and below the engine 7. Hereinafter, the components of the motorcycle 1 will be described in order.

(Vehicle Body Frame 2)

Referring to FIG. 1, the vehicle body frame 2 includes a head pipe 13, a pair of left and right main frames 14 extending rearward from the head pipe 13, and a pair of left and right pivot frames 15 extending downward from rear end portions of the pair of left and right main frames 14. A fuel tank (not shown) is supported in each of the main frames 14, and a rider seat (not shown) is disposed behind the fuel tank.

(Steering Mechanism 3 and Front Wheel 4)

Referring to FIG. 1, the steering mechanism 3 is rotatably supported by the head pipe 13. The steering mechanism 3 includes a handle device 17 and a pair of left and right front forks 18 connected to the handle device 17. The front wheel 4 is rotatably supported at a lower end portion of the pair of left and right front forks 18.

(Left and Right Swing Arms 5 and Rear Wheel 6)

Referring to FIG. 1, front end portions of a pair of left and right swing arms 5 are connected to lower portions of the pair of left and right pivot frames 15 via a pivot shaft 19. As a result, the pair of left and right swing arms 5 can swing about the pivot shaft 19. The rear wheel 6 is rotatably supported at rear end portions of the pair of left and right swing arms 5.

(Engine 7)

Figure 2:
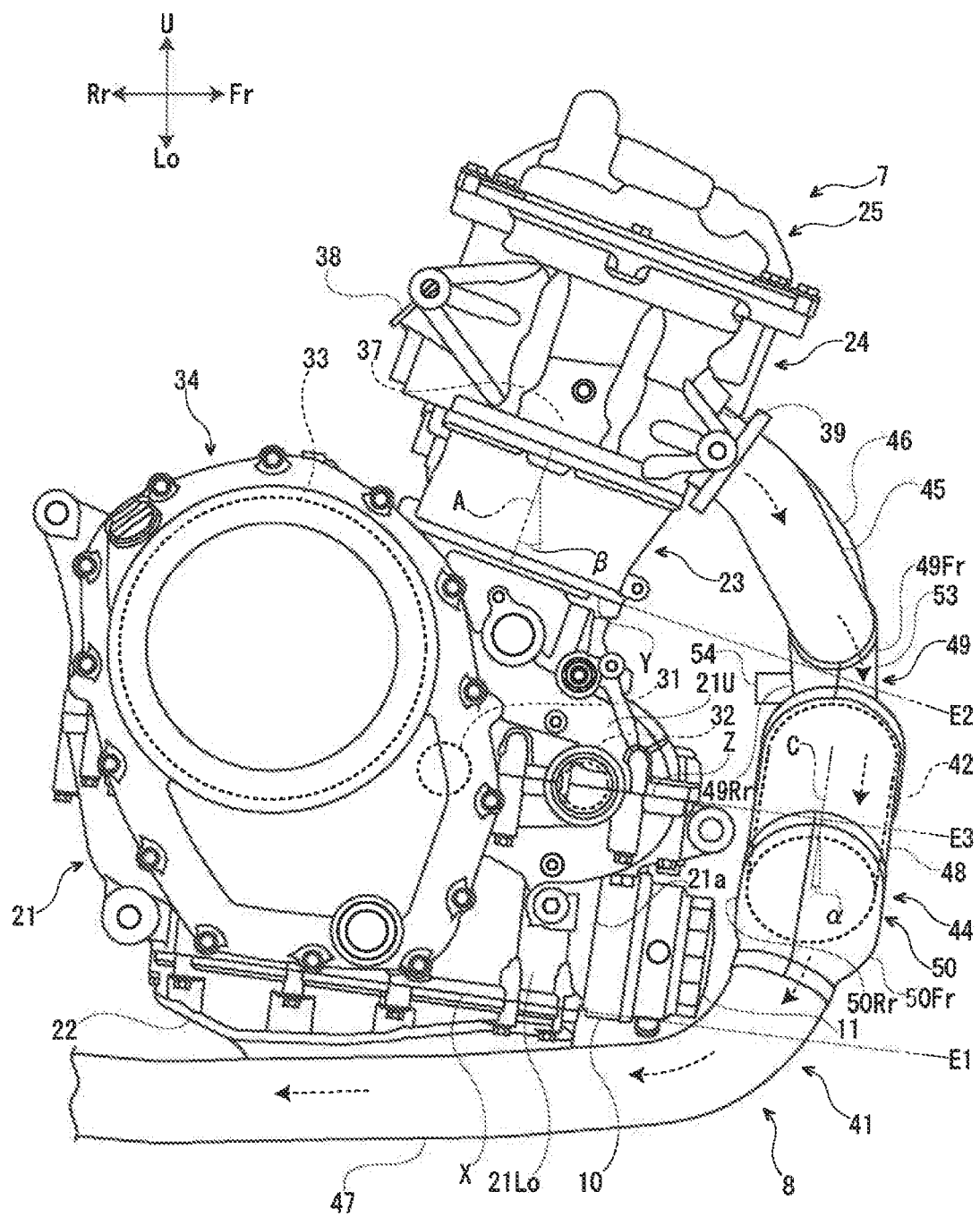
FIG. 2 is a right side view showing an engine and a peripheral portion thereof according to an embodiment of the present disclosure.
Figure 3:
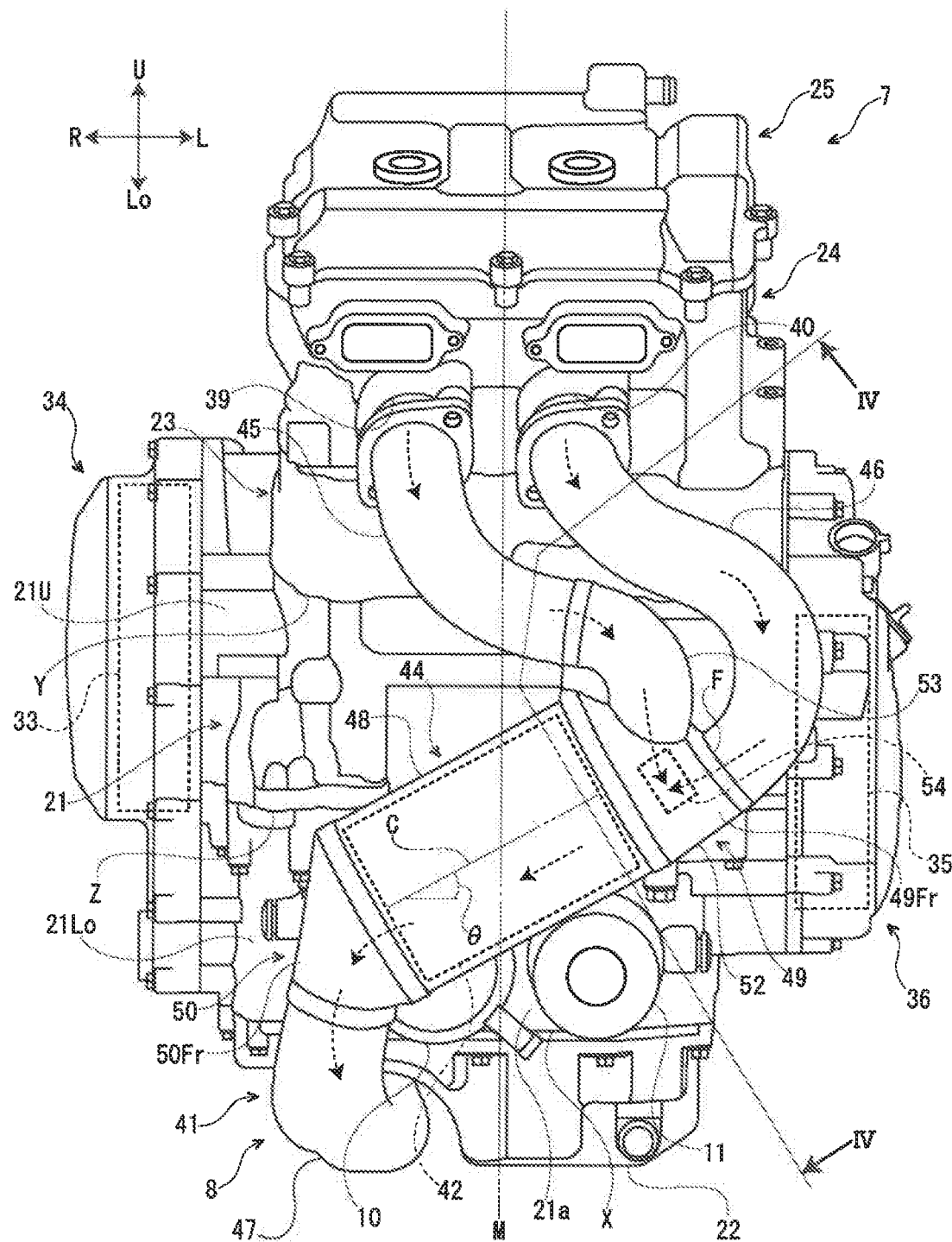
FIG. 3 is a front view showing an engine and a peripheral portion thereof according to an embodiment of the present disclosure.

Referring to FIGS. 2 and 3, the engine 7 is, for example, a water-cooled parallel two-cylinder engine. The engine 7 includes a crankcase 21, an oil pan 22 disposed below the crankcase 21, a cylinder 23 disposed above the crankcase 21, a cylinder head 24 disposed above the cylinder 23, and a cylinder head cover 25 disposed above the cylinder head 24.

The crankcase 21 is vertically divided into two parts. The crankcase 21 includes an upper case 21U and a lower case 21Lo. A crankshaft 31 is accommodated in a central portion of the crankcase 21. A balancer shaft 32 is accommodated in a front portion of the crankcase 21 in front of the crankshaft 31. The balancer shaft 32 is connected to the crankshaft 31 via a gear mechanism (not shown). A water pump (not shown) is fixed to the balancer shaft 32.

A clutch 33 is provided on the right side of the crankcase 21. The clutch 33 is connected to the crankshaft 31 via a primary reduction mechanism (not shown). The clutch 33 is covered with a clutch cover 34. A magneto 35 for power generation is provided on the left side of the crankcase 21. The magneto 35 is fixed to a left end portion of the crankshaft 31. The magneto 35 is covered with a magneto cover 36.

The oil pan 22 overlaps with the lower case 21Lo of the crankcase 21 from below. The oil pan 22 stores lubricating oil of the engine 7.

The cylinder 23 overlaps with the upper case 21U of the crankcase 21 from above. In a vehicle side view, an axial center A of the cylinder 23 is inclined forward as going upward. Two pistons (not shown) are accommodated in the cylinder 23. Each piston is connected to the crankshaft 31 via a connecting rod (not shown).

The cylinder head 24 is provided with two combustion chambers 37. Two intake ports 38 communicating with the two combustion chambers 37 are provided in a rear wall portion of the cylinder head 24. The two exhaust ports 39, 40 communicating with the two combustion chambers 37 are provided in a front wall portion of the cylinder head 24. Two exhaust ports 39, 40 are disposed in the vehicle width direction. In the vehicle front view, the center line M of the engine 7 in the vehicle width direction passes between the two exhaust ports 39, 40.

(Intake Device)

The intake device (not shown) includes two intake pipes connected to the respective intake ports 38 of the cylinder head 24, and an air cleaner connected to each intake pipe.

(Exhaust Device 8)

Hereinafter, in the description of the exhaust device 8, "upstream side" or "downstream side" indicates the "upstream side" or the "downstream side" in the flow direction of the exhaust gas in the exhaust device 8 (see the dotted arrows in FIGS. 2 and 3).

Referring to FIG. 1, the exhaust device 8 includes an exhaust pipe 41, a catalyst 42 disposed in the exhaust pipe 41, and a silencer 43 connected to a rear end portion (end portion on the downstream side) of the exhaust pipe 41.

(Exhaust Pipe 41 of Exhaust Device 8)

Referring to FIGS. 2 and 3, the exhaust pipe 41 of the exhaust device 8 includes a catalyst case 44 accommodating the catalyst 42, two upstream side pipes 45, 46 positioned on an upper side (upstream side) of the catalyst case 44, and a downstream side pipe 47 positioned on a lower side (downstream side) of the catalyst case 44.

Referring to FIG. 1, the catalyst case 44 of the exhaust pipe 41 is disposed behind the front wheel 4. In the vehicle side view, the front surface of the catalyst case 44 is positioned rearward of a front surface of the radiator 9. Therefore, in the vehicle side view, the front surface of the catalyst case 44 is positioned behind a vertical line V, and the front surface of the radiator 9 is positioned in front of the vertical line V.

Referring to FIG. 2, in the vehicle side view, the entirety of the catalyst case 44 is positioned in front of the crankcase 21. In the vehicle side view, the catalyst case 44 is positioned above an extension line E1 of a mating surface X of the lower case 21Lo of the crankcase 21 and the oil pan 22.

Figure 4:
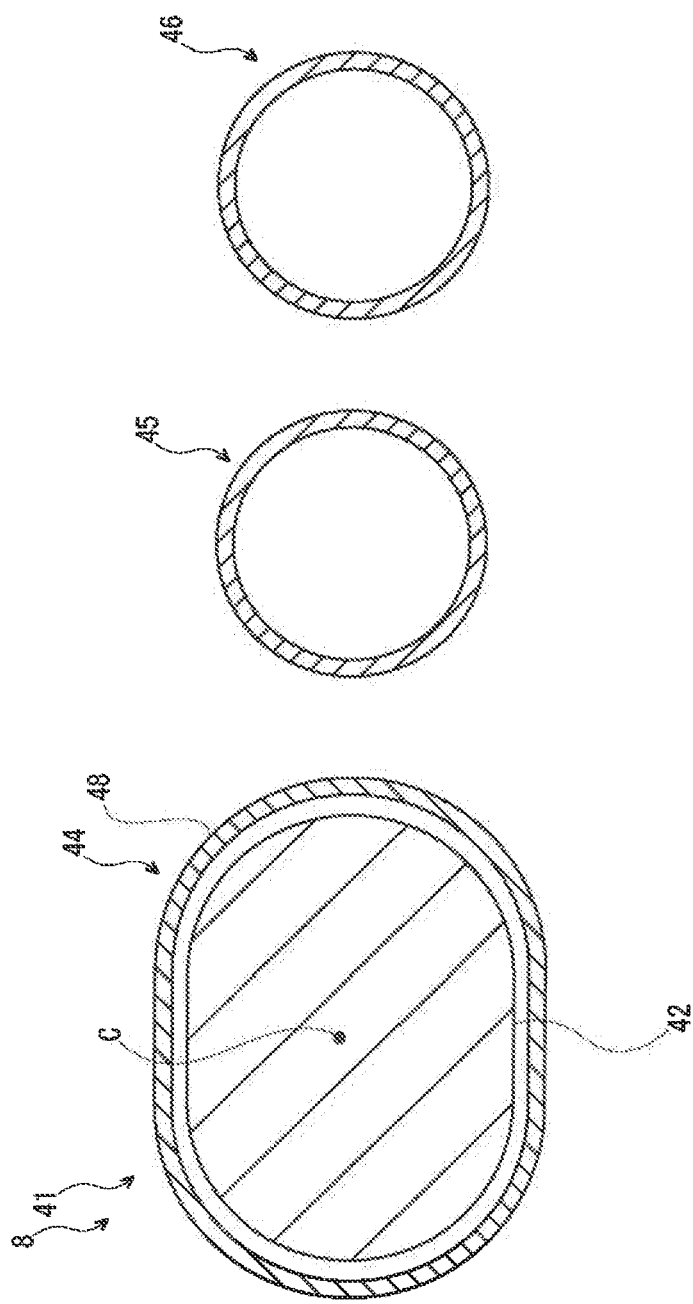
FIG. 4 is a cross-sectional view showing a cross section of an exhaust device taken along line IV-IV in FIG. 3.

Referring to FIGS. 2 to 4, the catalyst case 44 includes a cylindrical body 48 covering an outer periphery of the catalyst 42, an upstream side connector 49 positioned on the upper left side (upstream side) of the cylindrical body 48, and a downstream side connector 50 positioned on the lower right side (downstream side) of the cylindrical body 48.

The cylindrical body 48 of the catalyst case 44 has a cylindrical shape having a central axis C of the catalyst 42 as an axial direction. The cylindrical body 48 is formed of a single part molded integrally. That is, the cylindrical body 48 has an integral structure. The cross section of the cylindrical body 48 in a direction orthogonal to the flow direction of the exhaust gas has an elliptical shape. Here, the "elliptical shape" includes not only an elliptical shape (an elliptical shape in a geometric meaning) constituted by only a curve, but also an elliptical shape obtained by combining a curve and a straight line.

In the vehicle side view, the cylindrical body 48 of the catalyst case 44 is positioned below an extension line E2 of a mating surface Y of the upper case 21U of the crankcase 21 and the cylinder 23. In the vehicle side view, the cylindrical body 48 overlaps with an extension line E3 of a mating surface Z of the upper case 21U and the lower case 21Lo of the crankcase 21. In the vehicle side view, the front surface of the cylindrical body 48 is substantially parallel to a front surface 21a of the lower case 21Lo of the crankcase 21 (mounting surface of the oil cooler 10 and the oil filter 11).

The upstream side connector 49 of the catalyst case 44 connects the two upstream side pipes 45, 46 and the cylindrical body 48. The upstream side connector 49 is formed in a hollow shape by joining a front portion 49Fr and a rear portion 49Rr which are separately molded. Such a structure as the upstream side connector 49 is referred to as a monaca structure.

The upstream side connector 49 of the catalyst case 44 includes an enlarged diameter portion 52 and a tubular portion 53 positioned above the enlarged diameter portion 52. The enlarged diameter portion 52 increases in diameter from an upper left side (upstream side) toward a lower right side (downstream side). A right lower end portion (end portion on the downstream side) of the enlarged diameter portion 52 is connected to a left upper end portion (end portion on the upstream side) of the cylindrical body 48. An exhaust gas sensor 54 is attached to a rear surface of the enlarged diameter portion 52 in vicinity of a junction of the exhaust gas flowing from the tubular portion 53 and the exhaust gas flowing from the left upstream pipe 46. The tubular portion 53 has a shape bent downward. The lower end portion (end portion on the downstream side) of the tubular portion 53 is connected downward to an upper surface of the enlarged diameter portion 52.

The downstream side connector 50 of the catalyst case 44 connects the cylindrical body 48 and the downstream pipe 47. The downstream side connector 50 is formed in a hollow shape by joining a front portion 50Fr and a rear portion 50Rr which are separately molded. That is, the downstream side connector 50 has a monaca structure. The downstream side connector 50 is reduced in diameter from an upper left side (upstream side) toward a lower right side (downstream side). The left upper end portion (end portion on the upstream side) of the downstream side connector 50 is connected to the lower right end portion (end portion on the downstream side) of the cylindrical body 48.

The two upstream side pipes 45, 46 of the exhaust pipe 41 are disposed in the vehicle width direction. Each of the upstream side pipes 45, 46 is formed of a bent pipe. Each of the upstream side pipes 45, 46 is formed of a single part molded integrally. That is, each of the upstream side pipes 45, 46 has an integral structure. The total length of the right upstream side pipe 45 and the tubular portion 53 of the upstream side connector 49 of the catalyst case 44 is substantially the same as the length of the left upstream side pipe 46.

The right upstream side pipe 45 of the exhaust pipe 41 is curved leftward from the upper side (upstream side) toward the lower side (downstream side). Therefore, the right upstream side pipe 45 has a C shape in the vehicle front view. An upper end portion (end portion on the upstream side) of the right upstream side pipe 45 is connected to the exhaust port 39 on the right side of the cylinder head 24. A lower end portion (end portion on the downstream side) of the right upstream side pipe 45 is connected to an upper end portion (end portion on the upstream side) of the tubular portion 53 provided in the upstream side connector 49 of the catalyst case 44. In this way, the right upstream side pipe 45 connects the exhaust port 39 on the right side of the cylinder head 24 and the catalyst case 44.

The upper portion (portion on the upstream side) of the left upstream side pipe 46 of the exhaust pipe 41 is curved leftward from the upper side (upstream side) toward the lower side (downstream side). A lower portion (portion on the downstream side) of the left upstream side pipe 46 is curved rightward from the upper side (upstream side) toward the lower side (downstream side). Therefore, the left upstream side pipe 46 has an S-shape in the vehicle front view.

An upper end portion (end portion on the upstream side) of the left upstream side pipe 46 is connected to the exhaust port 40 on the left side of the cylinder head 24. A lower end portion (end portion on the downstream side) of the left upstream side pipe 46 is connected to a left upper end portion (end portion on the upstream side) of the enlarged-diameter portion 52 provided in the upstream side connector 49 of the catalyst case 44. In this way, the left upstream side pipe 46 connects the exhaust port 40 on the left side of the cylinder head 24 and the catalyst case 44. A connecting surface F of the lower end portion of the left upstream side pipe 46 and the left upper end portion of the enlarged-diameter portion 52 are substantially perpendicular to the central axis C of the catalyst 42.

The downstream side pipe 47 of the exhaust pipe 41 extends along the front-rear direction. A front end portion (end portion on the upstream side) of the downstream side pipe 47 is connected to the lower right end portion (end portion on the downstream side) of the downstream side connector 50 of the catalyst case 44.

(Catalyst 42 of Exhaust Device 8)

Referring to FIG. 1, the catalyst 42 of the exhaust device 8 is disposed at a portion on the upstream side of the exhaust pipe 41. The catalyst 42 is large in size as used in the motorcycle 1. The catalyst 42 is composed of, for example, a three-way catalyst having a honeycomb structure. The catalyst 42 purifies the exhaust gas by changing a harmful component (for example, carbon monoxide, hydrocarbon, nitrogen oxide) in the exhaust gas to a harmless component (for example, carbon dioxide, water, nitrogen) by chemical reaction.

Referring to FIG. 2, the catalyst 42 is disposed in front of the crankcase 21. In the vehicle side view, the central axis C of the catalyst 42 is inclined forward as going upward. In the vehicle side view, an inclination angle $\alpha$ of the central axis C of the catalyst 42 with respect to the vertical direction is smaller than an inclination angle $\beta$ of the axis A of the cylinder 23 with respect to the vertical direction.

Referring to FIG. 3, in the vehicle front view, the catalyst 42 is positioned within the width of the crankcase 21 in the vehicle width direction and is positioned within the width of the crankcase 21 in the upper-lower direction. In the vehicle front view, the central axis C of the catalyst 42 is inclined by approximately 30 degrees with respect to the vehicle width direction (horizontal direction). In the vehicle front view, an inclination angle $\theta$ of the central axis C of the catalyst 42 with respect to the vehicle width direction (horizontal direction) is, for example, 15° or more and 45° or less.

The catalyst 42 has a shape elongated in the flow direction of the exhaust gas. The center of the catalyst 42 in a longitudinal direction is positioned on the center line M of the engine 7 in the vehicle width direction. In the vehicle front view, the central axis C of the catalyst 42 and the center line M of the engine 7 in the vehicle width direction intersect at a position overlapping with the catalyst 42.

Referring to FIG. 4, the catalyst 42 is a so-called oval type. Therefore, the cross section of the catalyst 42 in a direction orthogonal to the flow direction of the exhaust gas has an elliptical shape. Here, the "elliptical shape" includes not only an elliptical shape (an elliptical shape in a geometric meaning) constituted by only a curve, but also an elliptical shape obtained by combining a curve and a straight line. The occupied area of the catalyst 42 in the direction perpendicular to the flow direction of the exhaust gas (area of a region formed on an inner peripheral side of a contour line of the entire catalyst 42) is larger than an opening area of each of the upstream side pipes 45, 46 in the direction orthogonal to the flow direction of the exhaust gas (area of a region formed on an inner peripheral side of each of the upstream side pipes 45, 46).

(Silencer 43 of Exhaust Device 8)

Referring to FIG. 1, the silencer 43 of the exhaust device 8 includes a chamber 56 and a muffler 57 connected to the chamber 56. The chamber 56 is connected to a rear end portion (end portion on the downstream side) of the downstream side pipe 47 of the exhaust pipe 41. A sub-catalyst (not shown) may be accommodated in the chamber 56 or the muffler 57.

(Radiator 9)

Referring to FIG. 1, the radiator 9 is, for example, a cross-flow type. The radiator 9 includes a pair of right and left tanks 61 (only the right tank 61 is displayed in FIG. 1) extending in the upper-lower direction and a plurality of tubes (not shown) extending in the vehicle width direction and connecting the pair of left and right tanks 61.

The radiator 9 is disposed behind the front wheel 4. The radiator 9 is disposed above the catalyst case 44 of the exhaust pipe 41. The radiator 9 is disposed on the upper front of the two upstream side pipes 45, 46 of the exhaust pipe 41.

(Oil Cooler 10)

Referring to FIGS. 2 and 3, the oil cooler 10 is, for example, a water-cooled type. An oil passage and a cooling water passage (both not shown) which are independent of each other are provided inside the oil cooler 10. The oil passage includes an oil introduction passage and oil lead-out passage extending in the front-rear direction, and a plurality of oil communication passages connecting the oil introduction passage and the oil lead-out passage. The cooling water passage is provided around the plurality of oil communication passages of the oil passage.

The oil cooler 10 is attached to the front surface 21*a* of the lower case 21Lo of the crankcase 21. In the vehicle side view, the oil cooler 10 is disposed behind the catalyst case 44 of the exhaust pipe 41. In the vehicle front view, approximately half of a front surface of the oil cooler 10 overlaps with the catalyst case 44 of the exhaust pipe 41. Therefore, the entire front surface of the oil cooler 10 cannot be visually recognized in the vehicle front view.

(Oil Filter 11)

Referring to FIGS. 2 and 3, the oil filter 11 is attached to the front surface 21*a* of the lower case 21Lo of the crankcase 21. A screw portion (not shown) is provided at a rear end portion of the oil filter 11. The screw portion is screwed into a screw groove (not shown) provided on the front surface 21*a* of the lower case 21Lo of the crankcase 21.

The oil filter 11 is provided on the left side of the oil cooler 10 adjacent to the oil cooler 10. That is, the oil filter 11 and the oil cooler 10 are disposed side by side in the left-right direction.

In the vehicle side view, the oil filter 11 is disposed behind the catalyst case 44 of the exhaust pipe 41. In the vehicle front view, the oil filter 11 is disposed below the catalyst case 44 of the exhaust pipe 41. In the vehicle front view, the front surface of the oil filter 11 does not overlap with the catalyst case 44 of the exhaust pipe 41. Therefore, the entire front surface of the oil filter 11 can be visually recognized in the vehicle front view.

(Exhaust of Engine 7)

Referring to FIGS. 2 and 3, when the engine 7 is driven, exhaust gas is discharged from the exhaust ports 39, 40 of the engine 7. The exhaust gas discharged from the exhaust port 39 on the right side of the engine 7 passes through the right upstream side pipe 45 and the tubular portion 53 of the upstream side connector 49, and flows into the enlarged diameter portion 52 of the upstream side connector 49. On the other hand, the exhaust gas discharged from the exhaust port 40 on the left side of the engine 7 passes through the left upstream side pipe 46, and flows into the enlarged diameter portion 52 of the upstream side connector 49. Therefore, the exhaust gas from the tubular portion 53 of the upstream side connector 49 and the exhaust gas from the left upstream side pipe 46 join and mix in the enlarged diameter portion 52 of the upstream side connector 49.

The exhaust gas having passed through the enlarged diameter portion 52 of the upstream side connector 49 flows into the catalyst 42 and is purified by the catalyst 42. The exhaust gas purified by the catalyst 42 sequentially passes through the downstream side connector 50, the downstream side pipe 47, and the chamber 56 and the muffler 57 of the silencer 43, and is discharged to the rear of the vehicle.

(Lubrication of Engine 7)

When the engine 7 is driven, an oil pump (not shown) is driven. When the oil pump is driven in this manner, the lubricating oil stored in the oil pan 22 flows into the oil filter 11 via the oil pump, and is filtrated by the oil filter 11. The lubricating oil filtrated by the oil filter 11 flows into the oil cooler 10 and is cooled by the oil cooler 10.

The lubricating oil cooled by the oil cooler 10 flows into each part of the engine 7 via an oil gallery (not shown), and lubricates each part of the engine 7. The lubricating oil that lubricated each part of the engine 7 is returned to the oil pan 22. As described above, the oil pump circulates the lubricating oil.

(Cooling of Engine 7)

When the engine 7 is driven, a water pump (not shown) is driven. When the water pump is driven in this manner, cooling water flows into the radiator 9 and is cooled by the radiator 9. A part of the cooling water cooled by the radiator 9 flows into each part of the engine 7 via the water pump, and cools each part of the engine 7. The cooling water that cooled each part of the engine 7 flows into the radiator 9 again. In this way, the water pump circulates the cooling water.

Another part of the cooling water cooled by the radiator 9 flows into the oil cooler 10 via the water pump, and cools the oil cooler 10. The cooling water that cooled the oil cooler 10 flows into the radiator 9 again.

In the present embodiment, the catalyst 42 is disposed in front of the engine 7. By adopting such an arrangement, even when the size of the catalyst 42 is increased, the minimum ground height and the bank angle can be sufficiently ensured.

In the embodiment, the occupied area of the catalyst 42 in the direction orthogonal to the flow direction of the exhaust gas is larger than the opening area of each of the upstream side pipes 45, 46 in the direction perpendicular to the flow direction of the exhaust gas. By adopting such a configuration, it is possible to sufficiently increase the size of the catalyst 42 and improve the purification performance of the catalyst 42 with respect to the exhaust gas.

Further, in the embodiment, the central axis C of the catalyst 42 is inclined with respect to the vehicle width direction, and the central axis C of the catalyst 42 and the center line M of the engine 7 in the vehicle width direction intersect at a position overlapping with the catalyst 42 in the vehicle front view. By adopting such an arrangement, even when the catalyst 42 is disposed in front of the engine 7, the exhaust ports 39, 40 of the engine 7 and the catalyst case 44 can be prevented from excessively approaching in the upper-lower direction. Therefore, it is possible to increase the size of the catalyst 42 while each of the upstream side pipes 45, 46 connecting each of exhaust ports 39 and 40 of the engine 7 and the catalyst case 44 can be formed. And it is possible to sufficiently improve the purification performance of the catalyst 42 with respect to the exhaust gas.

In addition, in the vehicle side view, the catalyst case 44 is positioned above the extension line E1 of the mating surface X of the lower case 21Lo of the crankcase 21 and the oil pan 22. By adopting such an arrangement, the minimum ground height and the bank angle can be more easily secured, and the catalyst 42 can be easily protected from flying stones and the like.

In addition, in the vehicle side view, the cylindrical body 48 of the catalyst case 44 is positioned below the extension line E2 of the mating surface V of the upper case 21U of the crankcase 21 and the cylinder 23. By adopting such an arrangement, even when the catalyst 42 is disposed in front of the engine 7, the exhaust ports 39, 40 of the engine 7 and the catalyst case 44 can be more easily prevented from excessively approaching in the upper-lower direction. Therefore, the exhaust ports 39, 40 of the engine 7 and the catalyst case 44 can be connected without hardship by the upstream side pipes 45, 46 formed by the bent pipes.

The tubular portion 53 of the upstream side connector 49 is connected downward to the enlarged diameter portion 52 of the upstream side connector 49. By adopting such a configuration, since it is possible to prevent the exhaust pipe 41 from protruding forward, it is possible to suppress the width of the vehicle in the front-rear direction.

The right upstream side pipe 45 is connected to the tubular portion 53 of the upstream connector 49, and the left upstream side pipe 46 is connected to the enlarged diameter portion 52 of the upstream side connector 49. By adopting such a configuration, the exhaust gas from the tubular portion 53 and the exhaust gas from the left upstream side pipe 46 join and mix in the enlarged diameter portion 52. Therefore, the exhaust gas can be distributed evenly over the entire area of the catalyst 42, and the purification performance of the catalyst 42 with respect to the exhaust gas can be further improved.

In addition, in the vehicle side view, the front surface of the catalyst case 44 is positioned behind the front surface of the radiator 9. By adopting such an arrangement, the clearance between the catalyst case 44 and the front wheel 4 can be sufficiently ensured even in a water-cooled model having the radiator 9. Therefore, even when the catalyst 42 is disposed in front of the engine 7, the width of the vehicle in the front-rear direction can be suppressed.

In addition, in the vehicle front view, the front surface of the oil filter 11 does not overlap with the catalyst case 44. By adopting such an arrangement, the oil filter 11 can be removed from the crankcase 21 without removing the exhaust pipe 41 by pulling out the oil filter 11 forward while releasing the screwing of the screw portion (not shown) of the oil filter 11 with respect to the screw groove (not shown) of the crankcase 21. Therefore, even when the catalyst 42 is disposed in front of the engine 7, the oil filter 11 can be easily replaced.

In addition, in the vehicle front view, the front surface of the oil cooler 10 overlaps with the catalyst case 44. By adopting such an arrangement, the oil cooler 10 can be disposed by effectively utilizing a space in front of the crankcase 21. The oil cooler 10 is less frequently replaced than the oil filter 11. Therefore, even when the front surface of the oil cooler 10 overlaps with the catalyst case 44, a major inconvenience is not caused.

In the vehicle side view, the inclination angle α of the central axis C of the catalyst 42 with respect to the vertical direction is smaller than the inclination angle β of the axial center A of the cylinder 23 with respect to the vertical direction. By adopting such an arrangement, it is possible to reduce the inclination angle of the catalyst case 44 accommodating the catalyst 42 with respect to the vertical direction. Therefore, the exhaust pipe 41 can be prevented from projecting forward, and the width of the vehicle in the front-rear direction can be suppressed.

MODIFIED EXAMPLE

In the present embodiment, the cylindrical body 48 of the catalyst case 44 has the integral structure. On the other hand, in other different embodiments, the cylindrical body 48 of the catalyst case 44 may have a monaca structure.

In the present embodiment, the upstream side connector 49 and the downstream side connector 50 of the catalyst case 44 are formed in the monaca structure. On the other hand, in other different embodiments, the upstream side connector 49 and/or the downstream side connector 50 of the catalyst case 44 may have an integral structure.

In the present embodiment, the cross section of the cylindrical body 48 of the catalyst case 44 and the cross section of the catalyst 42 are elliptical in the direction orthogonal to the flow direction of the exhaust gas. On the other hand, in other different embodiments, the cross section of the cylindrical body 48 of the catalyst case 44 and the cross section of the catalyst 42 may have a general circular shape (substantially circular shape) in the direction orthogonal to the flow direction of the exhaust gas.

The shapes of the catalyst case 44 and the upstream side pipes 45, 46 described in the present embodiment are merely examples, and in other different embodiments, these can be freely changed. For example, in other different embodiments, the catalyst case 44 (particularly the enlarged diameter portion 52) and each upstream side pipe 45, 46 may be reversed in the left-right direction, compared to the present embodiment.

In the present embodiment, the parallel two-cylinder engine is an example of the engine 7. On the other hand, in other different embodiments, a multi-cylinder engine other than a parallel two-cylinder engine, such as a V-type two-cylinder engine or a parallel four-cylinder engine may be used as an example of the engine 7, or a single-cylinder engine may be used as an example of the engine 7.

In the present embodiment, a water-cooled engine is an example of the engine 7. On the other hand, in other different embodiments, an engine other than a water-cooled engine, such as an air-cooled engine or an oil-cooled engine may be used as an example of the engine 7.

In the present embodiment, the configuration of the present invention is applied to an on-road motorcycle. On the other hand, in other different embodiments, the configuration of the present invention may be applied to an off-road motorcycle.

What is claimed is:

1. A motorcycle, comprising:
an engine including two exhaust ports;
an exhaust pipe connected to the exhaust port of the engine; and
a catalyst disposed within the exhaust pipe,
wherein the exhaust pipe includes a catalyst case accommodating the catalyst, and two pipes connecting the two exhaust ports of the engine and the catalyst case,
wherein the catalyst is disposed in front of the engine,
wherein an occupied area of the catalyst in a direction orthogonal to a flow direction of exhaust gas is larger than an opening area of the pipe in a direction orthogonal to a flow direction of exhaust gas, wherein a central axis of the catalyst is inclined with respect to a vehicle width direction in a vehicle front view, wherein the central axis of the catalyst and a center line of the engine in the vehicle width direction intersect at a position overlapping with the catalyst in the vehicle front view, wherein the catalyst case includes a cylindrical body covering an outer periphery of the catalyst, and a connector connecting the two pipes and the cylindrical body, wherein the connector includes an enlarged diameter portion that increases in diameter from an upstream side toward a downstream side in a flow direction of exhaust gas, and a tubular portion connected downward to the enlarged diameter portion, wherein one of the pipes is connected to the tubular portion, wherein the other one of the pipes is connected to the enlarged diameter portion, wherein the one of the pipes is curved from an one side toward the other side and has a C shape in the vehicle front view, wherein an upper portion of the other one of the pipes is curved toward the other side, wherein a lower portion of the other one of the pipes is curved toward the one side and is connected to the enlarged diameter portion, and wherein the other one of the pipes has a S shape in the vehicle front view.

2. The motorcycle according to claim 1,
wherein the engine includes a crankcase for accommodating a crankshaft, and an oil pan disposed below the crankcase, and wherein the catalyst case is positioned above an extension line of a mating surface of the crankcase and the oil pan, in a vehicle side view.

3. The motorcycle according to claim 1,
wherein the engine includes a crankcase for accommodating a crankshaft, and a cylinder disposed above the crankcase, wherein the catalyst case includes a cylindrical body covering an outer periphery of the catalyst, and wherein the cylindrical body is positioned below an extension line of a mating surface of the crankcase and the cylinder, in a vehicle side view.

4. The motorcycle according to claim 1, further comprising a radiator which cools cooling water of the engine,
wherein the radiator is disposed above the catalyst case, and wherein a front surface of the catalyst case is positioned behind a front surface of the radiator, in a vehicle side view.

5. The motorcycle according to claim 1, further comprising an oil filter which filtrates lubricating oil of the engine,
wherein the engine further includes a crankcase for accommodating a crankshaft, wherein the oil filter is attached to a front surface of the crankcase, wherein the oil filter is disposed below the catalyst case in the vehicle front view, and wherein a front surface of the oil filter does not overlap with the catalyst case in the vehicle front view.

6. The motorcycle according to claim 5, further comprising an oil cooler for cooling the lubricating oil of the engine,
wherein the oil cooler is attached to the front surface of the crankcase, and wherein a front surface of the oil cooler overlaps with the catalyst case in the vehicle front view.

7. The motorcycle according to claim 1,
wherein the engine includes a crankcase for accommodating a crankshaft, and a cylinder disposed above the crankcase, wherein a central axis of the catalyst and an axial center of the cylinder are inclined forward as going upward, in a vehicle side view, and wherein an inclination angle of the central axis of the catalyst with respect to a vertical direction is smaller than an inclination angle of the axial center of the cylinder with respect to the vertical direction, in the vehicle side view.

8. The motorcycle according to claim 1,
wherein in the vehicle front view, an inclination angle of the central axis of the catalyst with respect to the vehicle width direction is 15° or more and 45° or less.

9. A motorcycle, comprising:
an engine including two exhaust ports;
an exhaust pipe connected to the exhaust port of the engine; and
a catalyst disposed within the exhaust pipe,
a downstream side connector that is reduced in diameter from an upstream side toward a downstream side in a flow direction of exhaust gas,
wherein the exhaust pipe includes a catalyst case accommodating the catalyst, and two pipes connecting the two exhaust ports of the engine and the catalyst case,
wherein the catalyst is disposed in front of the engine,
wherein an occupied area of the catalyst in a direction orthogonal to a flow direction of exhaust gas is larger than an opening area of the pipe in a direction orthogonal to a flow direction of exhaust gas,
wherein a central axis of the catalyst is inclined with respect to a vehicle width direction in a vehicle front view,
wherein the central axis of the catalyst and a center line of the engine in the vehicle width direction intersect at a position overlapping with the catalyst in the vehicle front view,
wherein the catalyst case includes a cylindrical body covering an outer periphery of the catalyst, and a connector connecting the two pipes and the cylindrical body,
wherein the connector includes an enlarged diameter portion that increases in diameter from the upstream side toward the downstream side in the flow direction of exhaust gas, and a tubular portion connected downward to the enlarged diameter portion,
wherein one of the pipes is connected to the tubular portion,
wherein the other one of the pipes is connected to the enlarged diameter portion,
wherein the entire connector is disposed at the other side of the center line of the engine in the vehicle width direction, and
wherein the entire downstream side connector is disposed at an one side of the center line of the engine in the vehicle width direction.

* * * * *